(12) United States Patent
Lee et al.

(10) Patent No.: US 8,073,504 B2
(45) Date of Patent: Dec. 6, 2011

(54) PORTABLE TERMINAL (75) Inventors: Ul-Ho Lee, Seongnam-si (KR);
Yong-Jae Kim, Seongnam-si (KR)

(73) Assignee: KT Tech, Inc., Gyeonggi-do (KR)

( * ) Notice: Subject to any disclaimer, the term of this patent is extended or adjusted under 35 U.S.C. 154(b) by 688 days.

(21) Appl. No.: 11/922,915

(22) PCT Filed: Sep. 28, 2005

(86) PCT No.: PCT/KR2005/003222
§ 371 (c)(1),
(2), (4) Date: Nov. 17, 2008

(87) PCT Pub. No.: WO2007/001107
PCT Pub. Date: Jan. 4, 2007

(65) Prior Publication Data
US 2009/0131126 A1    May 21, 2009

(30) Foreign Application Priority Data
Jun. 27, 2005  (KR) .................... 10-2005-0055487

(51) Int. Cl.
*H04M 1/00*    (2006.01)
*H04M 9/00*    (2006.01)
*H04B 1/38*    (2006.01)
(52) U.S. Cl. ............. 455/575.3; 455/575.1; 455/566; 379/428.01; 379/433.13

(58) Field of Classification Search ............ 455/575.1, 455/575.3, 575.4, 566; 379/428.01, 433.13, 379/433.01
See application file for complete search history.

(56) References Cited

U.S. PATENT DOCUMENTS

| 7,146,200 | B2 * | 12/2006 | Park et al. | 455/575.3 |
| 7,419,099 | B2 * | 9/2008 | Lee et al. | 235/472.01 |
| 7,505,582 | B2 * | 3/2009 | Hickey et al. | 379/433.13 |
| 2002/0032010 | A1 * | 3/2002 | Okuda et al. | 455/90 |

FOREIGN PATENT DOCUMENTS

| KR | 10-2005-0007845 | 1/2005 |
| KR | 10-2005-007843 | 11/2006 |
| WO | WO 01/84729 A1 | 11/2001 |

* cited by examiner

*Primary Examiner* — Un C Cho
(74) *Attorney, Agent, or Firm* — Harness, Dickey & Pierce, P.L.C.

(57) ABSTRACT

A portable terminal, comprising a main body having a plurality of keys, a folder having a protrusion on the outer surface thereof, a first hinge part which connects the main body and the folder having a first hinge axis, and a second hinge part which connects to the first hinge part having a second hinge axis perpendicular to the first hinge axis, wherein the protrusion is formed to correspond to at least one of the keys when the main body and the folder are superposed with the inner surface of the folder exposed to the exterior, is convenient to use and carry, as the user may rotate the folder by a predetermined angle and use the keys attached to the main body.

15 Claims, 7 Drawing Sheets

PORTABLE TERMINAL

TECHNICAL FIELD

The invention relates to a portable terminal; in particular, a portable terminal with which the keys on the main body may be used by means of a protrusion formed on the outer surface of the folder when the main body and the folder are superposed with the inner surface of the folder exposed to the exterior.

BACKGROUND ART

With such functions as camera and camcorder implemented on portable phones, PDA's, and portable computers, the swivel hinge is being extensively used, which allows display on a wide screen by rotating the folder and fitting it to the main body. In particular, with the wide-spread use of DMB (Digital Multimedia Broadcasting), the need to fit the folder to the main body for long hours is increasing. Also, the addition of multimedia functions has caused a demand for keys that can perform various complicated functions, which creates a burden on the design stage of implementing extra keys.

Figure 1:
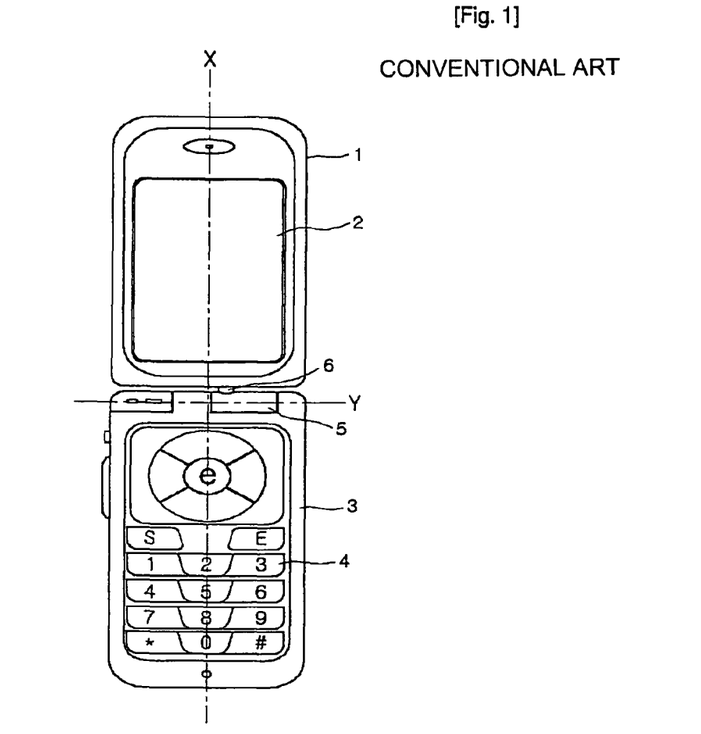
FIG. 1 is a perspective view of a portable terminal having a conventional eccentric swivel hinge.
Figure 2:
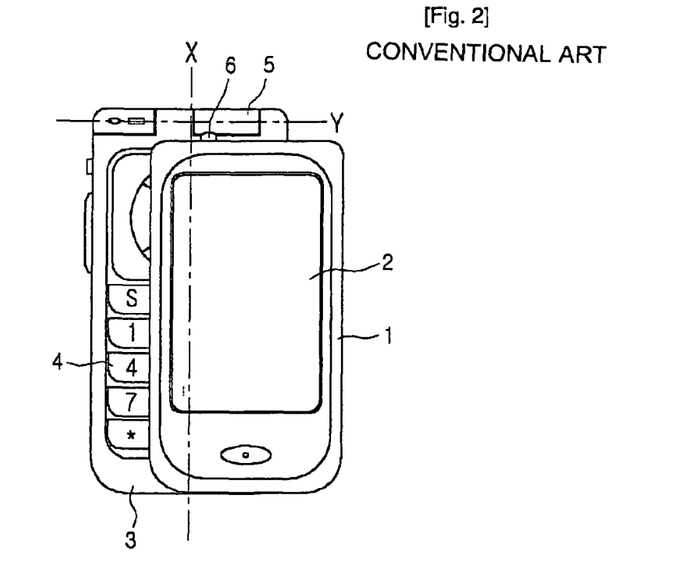
FIG. 2 is a perspective view of the portable terminal of FIG. 1 illustrating the state wherein the folder is rotated and fitted to the main body.

FIGS. 1 and 2 are a perspective view of a portable terminal having a conventional eccentric swivel hinge and a perspective view illustrating the state wherein the folder is rotated and fitted to the main body.

For the portable terminal having a swivel hinge shown in FIGS. 1-2, the folder 1 is asymmetrically rotated by a swivel hinge 6 formed eccentrically to the central axis X and is attached to the main body 3. Thus, as shown in FIG. 2, a portion of the keys 4 on the main body 3 is exposed to the exterior. Extra functions are assigned to the exposed keys 4 when the folder 1 is fitted to the main body 3. For example, when the folder 1 has not rotated, they may be used as dial or alphanumeric keys, whereas when the folder 1 rotates to expose the interior display screen 2 to the exterior as shown in FIG. 2, the exposed keys 4 act as keys that perform multimedia functions such as camera, camcorder, MP3 player, or DMB, etc.

DISCLOSURE OF INVENTION

Technical Problem

However, with such a portable terminal having an eccentric swivel hinge, as shown in FIG. 1, the shape of the terminal is asymmetrically formed when it used with the inner display screen 2 exposed to the exterior, making it unsightly in appearance. Also, since the asymmetrical portion leads to a corresponding increase in size, there is the problem that the use and carriage of the terminal is made inconvenient when the use of the keys 4 is not needed.

Technical Solution

The invention has been developed to solve the foregoing problems, and it is therefore an objective of the invention to provide a portable terminal with which the keys on the main body may be used by rotating the folder by a predetermined angle when the main body and the folder are superposed with the inner surface of the folder exposed to the exterior.

Another objective of the invention is to provide a portable terminal which can be restored to its original position via elastic force after the folder is rotated.

The above objectives of the invention are realized in the following embodiment.

A portable terminal according to an embodiment of the invention comprises: a main body having a plurality of keys, a folder having a protrusion on the outer surface thereof, a first hinge part which connects the main body and the folder having a first hinge axis, and a second hinge part which connects to the first hinge part having a second hinge axis perpendicular to the first hinge axis, wherein the protrusion is formed to correspond to at least one of the keys when the main body and the folder are superposed with the inner surface of the folder exposed to the exterior.

Because such a portable terminal according to such an embodiment allows the use of the keys on the main body by means of the folder rotating by a predetermined angle and causing the protrusion to press the keys, it is convenient to use and easy to carry.

To allow the folder to rotate about the second hinge axis by a predetermined angle when the main body and the folder are superposed with the inner surface of the folder exposed to the exterior, the second hinge part comprises a rotation guide having a rotation clearance and a rotation latch bit guided by the rotation guide.

The second hinge part further comprises a hinge axis insertion part, into which the second hinge axis is inserted, and an elastic member positioned between the second hinge axis and the hinge axis insertion part. Thus, since the folder can be restored to its original position by means of the elastic member, no further action is necessary after rotating the folder to press the keys.

Between the second hinge axis and the hinge axis insertion part are included a first groove through which a portion of the elastic member is projected, and a second groove formed in correspondence to the first groove which carries the elastic member projected through the first groove. The first groove comprises a projection hole through which the elastic member is projected, and a carriage groove aligned with the projection hole which carries the alteration of the elastic member.

A portion of the elastic member may be an arc-shaped flat spring or torsion spring.

Preferably, at least one or more of the protrusions are formed on the folder to the left and right respectively of the second hinge axis.

At least one of the keys corresponding to the protrusion perform different functions from their original functions when the main body and the folder are superposed with the inner surface of the folder exposed to the exterior.

MODE FOR THE INVENTION

Hereinafter, embodiments of the invention will be described in more detail, where in the description with reference to the accompanying drawings, those components are rendered the same reference number that are the same or are in correspondence regardless of the figure number, and redundant explanations are omitted.

Figure 3:
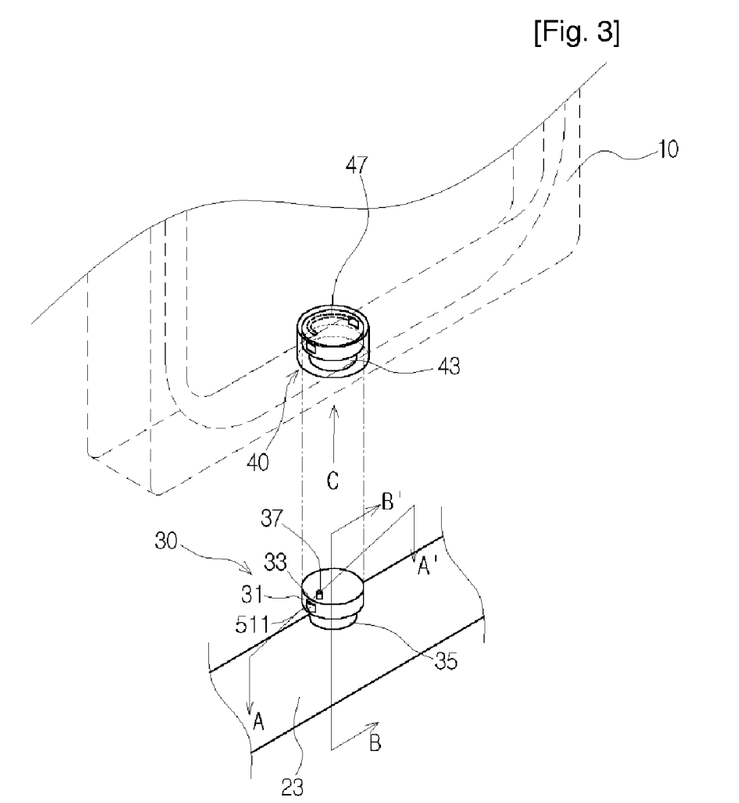
FIG. 3 is a perspective view of the first hinge part and the second hinge part according to an embodiment of the invention.

FIG. 3 is a perspective view of the first hinge part and the second hinge part according to an embodiment of the invention. As seen in FIG. 3, the first hinge part according to an embodiment of the invention comprises the first hinge axis 23 and a hinge arm, which rotatably supports both ends of the first hinge axis 23, and the second hinge part comprises a second hinge axis 30, which joins with the first hinge axis 23, and a hinge axis insertion part 40 into which the second hinge axis 30 is rotatably inserted.

The second hinge axis 30 is projected out on one side of the first hinge axis 23 formed on the upper part of the main body and comprises an axis body part 35, an axis head part 31 formed on one end of the axis body part 35, a rotation latch bit 37 projected out of the axis head part 31, and a first groove 33 formed in the outer perimeter of the axis head part 31. The second hinge axis 30 connects the folder 10 and the main body, and supports the folder to allow 180° rotation. Also, when the folder 10 is superposed on the main body with the inner surface (not shown) of the folder 10 exposed to the exterior, the second hinge axis 30 allows the folder 10 to rotate by a predetermined angle.

The axis body part 35 has a cylindrical shape and is projected out from a predetermined position on the first hinge axis 23, with one end connected to the axis head part 31. The axis body part 35 is inserted into the insertion body part 43 of the hinge axis insertion part 40.

The axis head part 31 is formed on one end of the axis body part 35, and is inserted into the hinge axis insertion part 40. In the outer perimeter of the axis head part 31 is formed the first groove 33. The axis head part 31 has a cylindrical shape with a diameter greater than that of the axis body part 35, and its lower surface is caught on the ledge 411 positioned at the boundary between the insertion head part 41 and the insertion body part 43 (see FIG. 6). Thus, the axis head part 31 connects the folder 10 and the main body while at the same time allows the folder 10 to rotate. Out of the upper surface of the axis head part 31 is projected the rotation latch bit 37.

The rotation latch bit 37 is a protrusion positioned on the upper surface of the axis head part 31, and is inserted into the rotation guide 47 formed in the interior of the hinge axis insertion part 40. When the folder 10 is rotated about the second hinge axis 30, the rotation latch bit 37 is guided by the rotation guide 47. Thus, the folder 10 rotates as much as the rotation clearance of the rotation latch bit 37.

At least one or more of the first groove 33 are formed in the outer perimeter of the axis head part 31, and comprise a projection hole 331 through which the curve part 511 of the flat spring 51 is projected, and a carriage groove 333 aligned with the projection hole 331 which carries the alteration of the flat spring 51.

The curve part 511 of the flat spring 51 is projected through the projection hole 331, and pressure is applied on the curve part 511 by the inner perimeter of the hinge axis insertion part 40 or the second groove 45. The carriage groove 333 is a groove aligned with the projection hole 331 and formed along the circumference of the axis head part 31. The composition of the projection hole 331, carriage groove 333 and the hinge axis insertion part 40 will be discussed in more detail with reference to FIGS. 4-5.

The hinge axis insertion part 40 comprises an insertion head part 41, into which the axis head part 31 is inserted, an insertion body part 43, into which the axis body part 35 is inserted, and a rotation guide 47, which guides the rotation latch bit 37. The second hinge axis 30 is inserted into the hinge axis insertion part 40, and flat springs 51 or torsion springs 53 are positioned between the hinge axis insertion part 40 and the second hinge axis 30.

The insertion body part 43 is a space with a shape identical to the axis body part 35, and is aligned with the insertion head part 41 with the ledge 411 as the boundary. In the inner perimeter of the insertion head part 41 is formed the second groove 45 in correspondence to the first groove 33.

Preferably, the second groove 45 has a cross section the shape of an arc, and a shape symmetrical with respect to the vertex 451. The second home 45 carries the curve part 511 or body part 531 of the flat spring 51 or torsion spring 53, and is in contact with the vertical hem of the flat spring 51 or torsion spring 53.

The first hinge part comprises the first hinge axis 23 with which the second hinge axis 30 is joined and the hinge arms (25 of FIG. 10) which rotatably supports both ends of the first hinge axis 23.

As the folder 10 is rotated about the first hinge axis 23, the folder 10 opens or closes the front surface of the main body. The direction extending along the first hinge axis 23 is perpendicular to the second hinge axis 30. The hinge arms 25 are positioned on the upper part of the main body 20 and rotatably support both ends of the first hinge axis 23.

Figure 4:
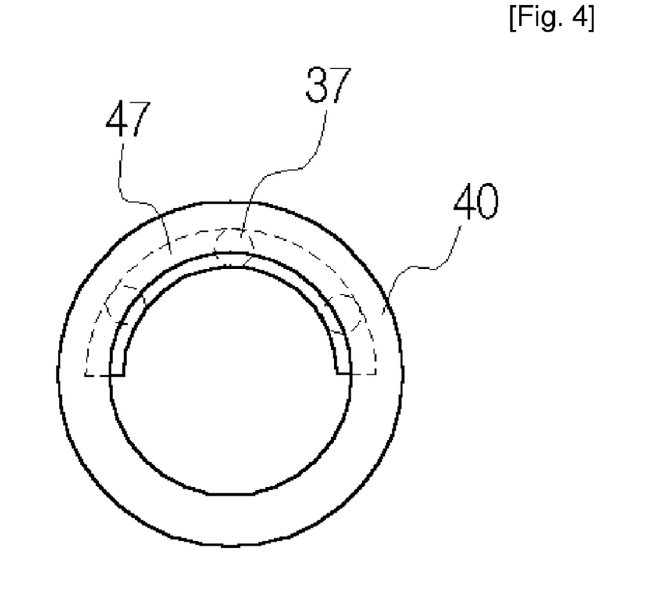
FIG. 4 is a schematic drawing illustrating the interior of the hinge axis insertion part of FIG. 3, as seen from direction C.

FIG. 4 is a schematic drawing illustrating the interior of the hinge axis insertion part 40 of FIG. 3, as seen from direction C. As seen in FIG. 4, in one surface of the hinge axis insertion part 40 is formed a rotation guide 47 which guides the rotation latch bit 37. The rotation guide 47 has the shape of an arc and has a predetermined rotation clearance a. Further rotation of the folder 10 becomes impossible as the rotation latch bit 37 is caught on either end of the rotation guide 47. Thus, the rotation clearance a of the rotation guide 47 is equal to the rotation angle of the folder 10. Preferably, the rotation clearance a of the rotation guide 47 is 180°.

Figure 5:
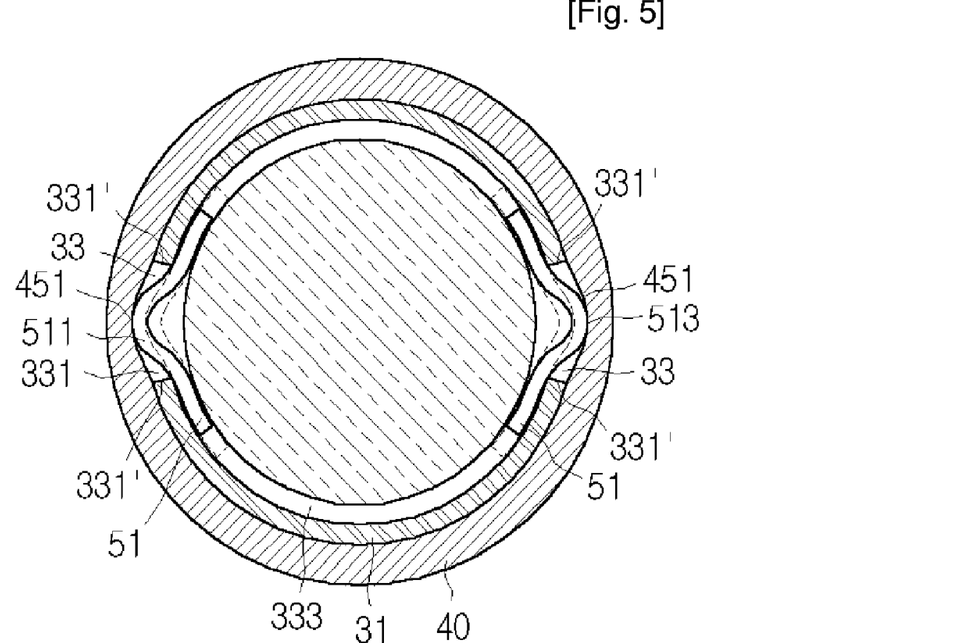
FIG. 5 is a cross-sectional view across the line AA' of FIG. 3.
Figure 6:
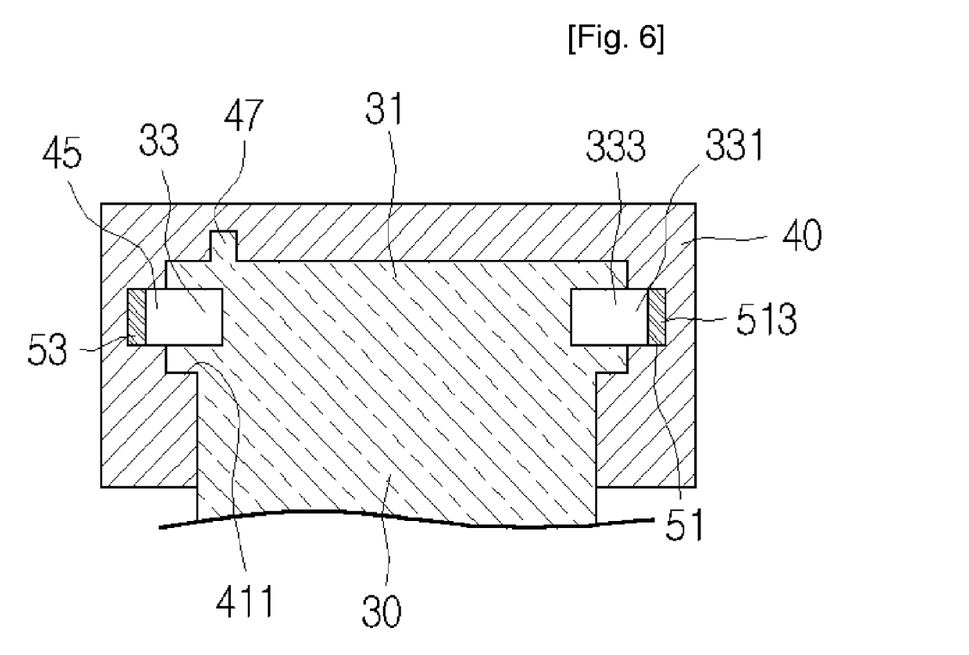
FIG. 6 is a cross-sectional view across the line BB' of FIG. 3.
Figure 10:
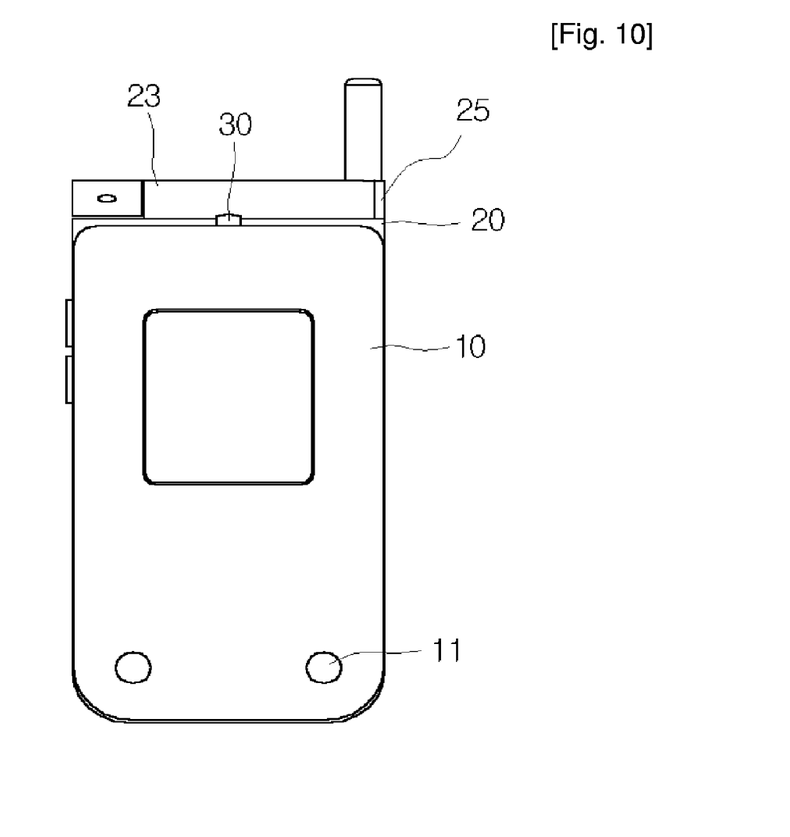
FIG. 10 is a perspective view of a portable terminal according to an embodiment of the invention wherein protrusions are formed on the outer surface of the folder.

FIG. 5 is a cross-sectional view across the line AA' of FIG. 4, and FIG. 6 is a cross-sectional view across the line BB' of FIG. 3, and more specifically, they are cross-sectional views of the second hinge axis 30 and the hinge axis insertion part 40 for the state wherein the folder 10 is closed and fitted to the main body 20 as in FIG. 10 or the state wherein the folder 10 is rotated 180° and fitted to the main body 20.

As seen in FIG. 5, projection holes 331 are formed in certain intervals in the outer perimeter of the axis head part 31. The projection holes 331 are aligned with the carriage groove 333. Both side surfaces 331' of the projection hole 331 are in contact with the elastic member 51. A number of projection holes 331 may be formed along the circumference of the axis head part 31.

The second groove 45 is a groove formed in correspondence to the first groove 33 in the inner perimeter of the hinge axis insertion part 40. The second groove 45 has a cross section the shape of an arc. The inner surface of the second groove 45 is in contact with the vertical hem 513 of the elastic member 51.

The elastic member 51 is a flat spring with a cross section the shape of an arc, and has a curve part 511 of which a portion is folded to be in contact with the second groove 45 through the projection hole 331. The curve part 511 projected through the projection hole 331, as seen in FIG. 6, is inserted through the second groove 45 of the hinge axis insertion part 40 and applies pressure on the inner surface of the second groove 45. Since both side surfaces of the flat spring 51 are in contact with both side surfaces 331' of the projection hole 331, there is no movement along the circumference within the carriage groove 333.

When the folder 10 would be rotated to apply pressure on the keys after the folder 10 is rotated 180° and fitted to the main body (see FIG. 11), the inner surface of the second groove 45 applies pressure on the vertical hem 513 of the elastic member 51 and moves by a predetermined angle. Here, as the curve part 511 of the elastic member 51 is flattened out due to the pressure applied by the second groove 45, and is retreated into the carriage groove 333 (represented by dotted lines). When the force applied on the folder 10 is removed after the protrusion formed on the folder 10 presses the key, the curve part 511 of the elastic member 51 is contracted again due to elastic force and is projected through the projection hole 331, thereby applying pressure on the second groove 45. Consequently, the vertex 451 of the second groove 45 and the vertical hem 513 of the elastic member 51 are again in contact, so that the folder 10 is restored to its original state.

Although FIG. 3 illustrates the second hinge axis 30 as projecting out from the first hinge axis 23 formed on the main body and the hinge axis insertion part 40 as being formed on the lower surface of the folder 10, conversely, the second hinge axis 30 may be formed on the folder 10 with the hinge axis insertion part 40 on the main body. Also, although FIG. 3 illustrates the second hinge axis 30 as having the first groove 33 and the hinge axis insertion part as having the second groove 45, conversely, the hinge axis insertion part 40 may have the first groove 33 with the second hinge axis 30 having the second groove 45.

Figure 7:
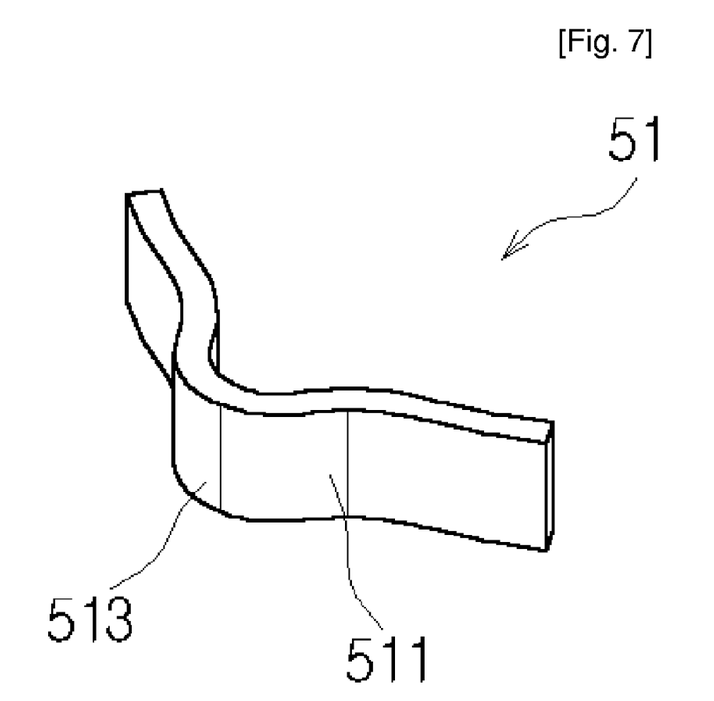
FIG. 7 is a perspective view of a flat spring according to an embodiment of the invention.

FIG. 7 is a perspective view of an elastic member 51 according to an embodiment of the invention.

The elastic member illustrated in FIG. 7, which is a flat spring 51, is projected out from the projection hole 331 and has a curve part 511 that is in contact with the second groove 45. The vertical hem of the flat spring 51, as seen in FIG. 6, prevents random movement of the folder 10 by applying pressure on the second groove 45 formed in the hinge axis insertion part 40 and performs the function of restoring the folder 10 to its original position when it is rotated by a predetermined angle. Also, when the folder 10 is rotated 180°, the flat spring 51 is caught in the second groove 45', thus performing the function of setting the position of the folder 10.

Figure 8:
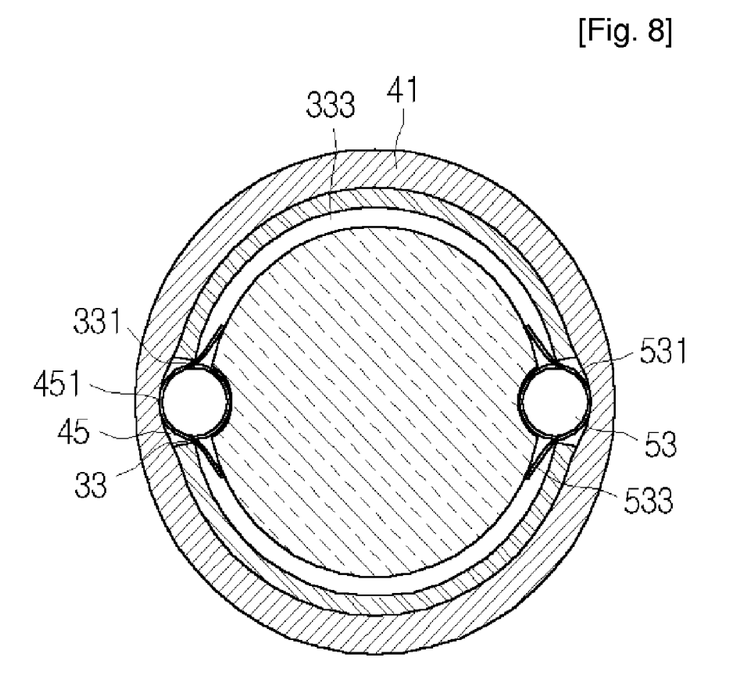
FIG. 8 is a cross-sectional view of another embodiment of the invention wherein torsion springs are positioned between the second hinge axis and the hinge axis insertion part.
Figure 9:
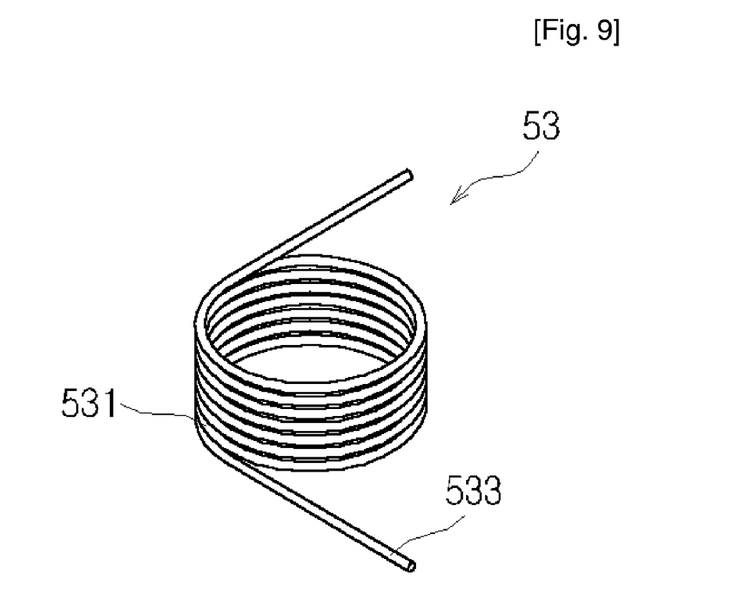
FIG. 9 is a perspective view of a torsion spring of FIG. 7.

FIG. 8 is a cross-sectional view illustrating the state wherein torsion springs 53 are inserted instead of flat springs 51 as the elastic members in the first groove 33 of FIG. 5, and FIG. 9 is a perspective view of the torsion spring 53.

The torsion spring 53, as seen in FIG. 9, comprises a body part 531 and leg parts 533 extending out at a predetermined angle from the body part 531. The body part 531 is projected through the first groove 33 formed in the second hinge axis 30 and applies pressure on the inner surface of the second groove 45 formed in the hinge axis insertion part 40. The diameter of the body part 531 is equal or approximate to that of the projection hole 331. Therefore, the torsion spring 53 does not move around within the first groove 33. The body part 531 may have a circular or elliptical cross section. As the leg parts 533 apply pressure on the inner perimeter surface of the carriage groove 333, the body part 531 is projected into the projection hole 331.

By apply pressure on the second groove 45 formed in the hinge axis insertion part 40, the torsion springs 53 prevent random movement of the folder 10 and perform the function of restoring the folder 10 to its original position when it is rotated by a predetermined angle. Also, when the folder is rotated 180°, the torsion springs 51 are caught in the second groove 45', thus performing the function of setting the position of the folder 10.

When the folder 10 is rotated 180°, as the second groove 45 rotates and applies pressure on the torsion spring 53, the leg parts 533 are spread out and the body part 531 is retreated into the carriage groove 333 (represented by dotted lines). Also, when the folder 10 is rotated 180° and the first groove 33 is perfectly aligned with the second groove 45', the body part 531 is projected through the projection hole 331 due to the elastic force of the leg parts 533 and is caught in the second groove 45'.

While the folder 10 is rotated 180°, when the folder 10 is rotated by a predetermined angle to press the keys on the main body, the inner surface of the second groove 45 applies pressure on the body part 531, and here, the leg parts 533 apply elastic force on the body part 531. Therefore, when the force applied on the folder 10 is removed, the vertical hem of the body part 531 slides while in contact with the inner surface of the second groove 45 and touches the vertex 451 due to the elastic force of the leg parts 533 so that the folder 10 is restored to its original position.

FIG. 10 is a perspective view of a portable terminal according to an embodiment of the invention.

As seen in FIG. 10, a portable terminal according to an embodiment of the invention comprises a folder 10 on which a number of protrusions 11 are formed on the outer surface thereof, and a main body 20 connected to the folder 10, the second hinge axis 30, and the hinge axis insertion part 40.

The protrusions 11 are positioned symmetrically with respect to the second hinge axis 30 on the outer surface of the folder 10. The number and positions of the protrusions 11 may be varied as needed. For example, although two protrusions 11 are positioned at the lower part of the folder 10 in FIG. 10, four or six protrusions 11 may be positioned in constant intervals on the outer surface of the folder 10.

Figure 11:
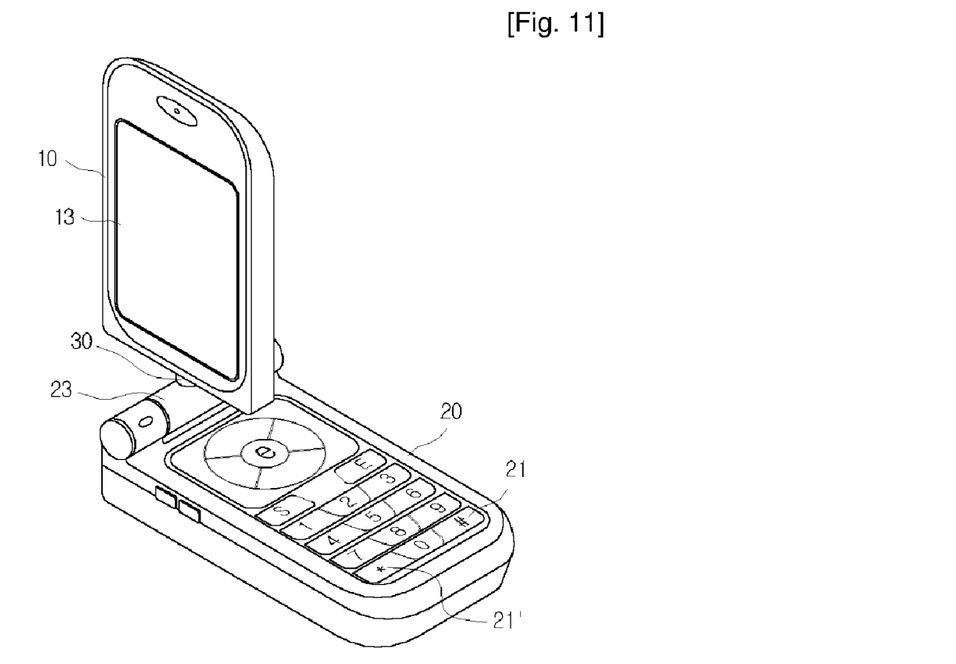
FIG. 11 is a perspective view illustrating the state wherein the folder of a portable terminal according to an embodiment of the invention is rotated about the second hinge axis.

FIG. 11 is a perspective view illustrating a portable terminal according to an embodiment of the invention wherein the folder 10 is rotated by means of the second hinge axis 30 and the hinge axis insertion part (not shown).

The first hinge axis 23 formed on the upper part of the main body 20 rotatably supports the folder 10 so that the folder 10 may open or close with respect to the main body 20. The second hinge axis 30 and the hinge axis insertion part 40 connect the folder 10 to the first hinge axis 40 and support the folder 10 so that it may rotate 180°. The folder 10 has an inner display screen 13 on the inner surface thereof.

The main body 20 has a number of keys 21, and the keys 21 are in contact with the protrusions 11 when the folder is rotated 180° and fitted to the main body 20. When the folder is rotated 180° and fitted to the main body 20 with the inner display screen 13 exposed to the exterior, the keys 21 corresponding to the protrusions 11 on the outer surface of the folder 10 have different functions from their original functions. For example, when the folder 10 is rotated about the second hinge axis 30, the key 21 positioned on the right in FIG. 10 may have "play" and "stop" functions and the key 21' positioned on the left may have "fast forward" and "rewind" functions for video content.

Figure 12:
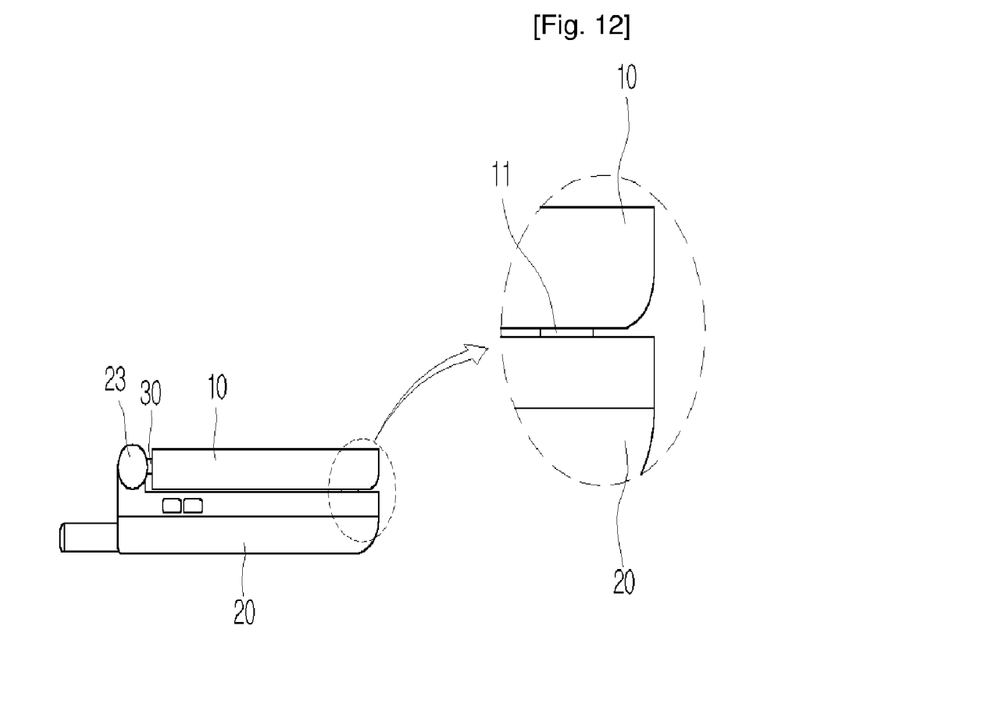
FIG. 12 is a side elevation view of a portable terminal according to an embodiment of the invention.

FIG. 12 is a side elevation view illustrating a portable terminal according to an embodiment of the invention, wherein the folder is rotated 180° and fitted to the main body 20 with the inner display screen 13 exposed to the exterior.

As seen in FIG. 12, the protrusions 11 are in contact with the keys 21 on the main body 20, so that it is possible for the folder to rotate by a predetermined angle about the second hinge axis 30. Preferably, the protrusions 11 are formed at positions corresponding to the keys 21.

Figure 13:
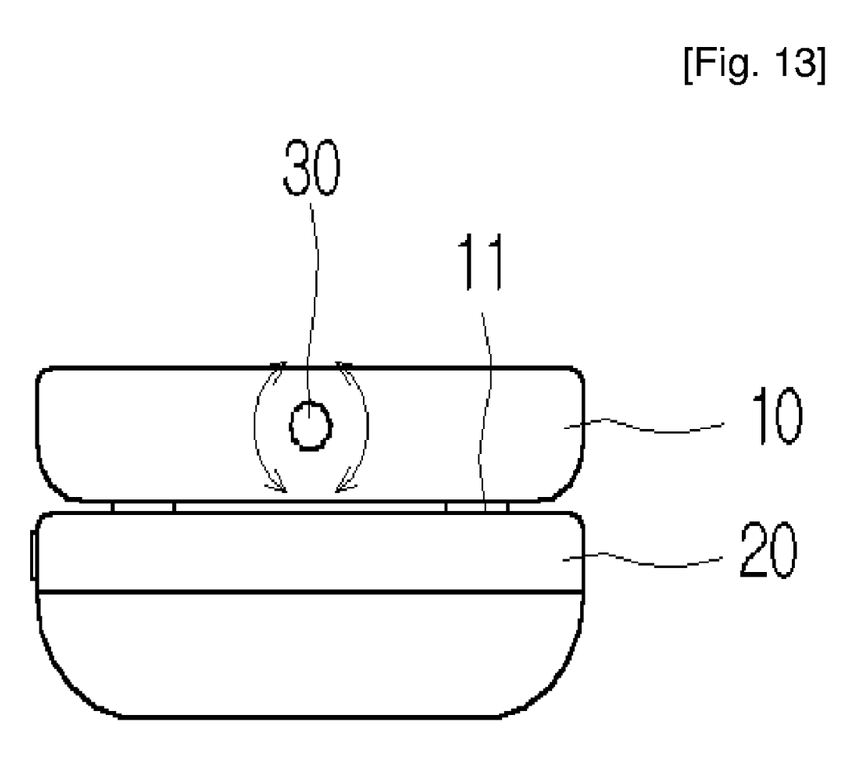
FIG. 13 is a schematic drawing illustrating the state wherein the folder of the terminal is rotatable by a predetermined angle about the second hinge axis.

FIG. 13 is a schematic drawing illustrating the state wherein the folder of the portable terminal according to an embodiment of the invention is rotated by the second hinge axis 30.

As seen in FIG. 13, the folder 10 is rotated by a predetermined angle about the second hinge axis 30, and here, the protrusion 11 presses the key 21. When the force applied to the folder 10 is removed, the folder 10 is restored to its original position by the flat spring 51 or the torsion spring 53.

Although the foregoing description details various embodiments of the invention, it will be appreciated that the embodiments are only examples of realizing the spirit of the invention, and that any changed or modified examples remain within the scope of the invention so long as they do not depart from the spirit of the invention. For example, the invention may be applied not only to portable phones but to portable computers or camcorders, etc.

INDUSTRIAL APPLICABILITY

Through the foregoing composition, the invention may provide the following effect.

The invention provides a portable terminal that is convenient to use and carry, as the keys attached to the main body may be used by rotating the folder by a predetermined angle when the folder is fitted to the main body with the inner display screen exposed to the exterior.

The invention claimed is:

1. A portable terminal, comprising:
a main body having a plurality of keys;
a folder having a protrusion on an outer surface thereof;
a first hinge part connecting the main body and the folder, the first hinge part having a first hinge axis; and
a second hinge part connected to the first hinge part, the second hinge part having a second hinge axis perpendicular to the first hinge axis;
wherein the protrusion is formed to correspond to at least one of the keys when the main body and the folder are superposed and an inner surface of the folder is exposed to an exterior, and
at least one of the keys corresponding to the protrusion perform different functions from their original functions when the main body and the folder are superposed and the inner surface of the folder is exposed to the exterior.

2. The portable terminal according to claim 1, wherein the second hinge part further comprises:
a rotation guide having a rotation clearance which allows the folder to rotate about the second hinge axis by a set angle when the main body and the folder are superposed with the inner surface of the folder exposed to the exterior; and
a rotation latch bit guided by the rotation guide.

3. The portable terminal according to claim 1, wherein the second hinge part further comprises:
a hinge axis insertion part into which the second hinge axis is inserted; and
an elastic member positioned between the second hinge axis and the hinge axis insertion part.

4. The portable terminal according to claim 3, further comprising:
a first groove between the second hinge axis and the hinge axis insertion part, through which a portion of the elastic member is projected; and
a second groove between the second hinge axis and the hinge axis insertion part, formed in correspondence to the first groove which carries the elastic member projected through the first groove.

5. The portable terminal according to claim 4, wherein the first groove comprises:
a projection hole through which the elastic member is projected; and
a carriage groove aligned with a projection hole which carries an alteration of the elastic member.

6. The portable terminal according to claim 4, wherein the second groove has a cross section of an arc.

7. The portable terminal according to claim 6, wherein an inner surface of the second groove is in contact with a vertical hem of the elastic member.

8. The portable terminal according to claim 3, wherein a portion of the elastic member is an arc-shaped flat spring.

9. The portable terminal according to claim 3, wherein the elastic member is a torsion spring.

10. The portable terminal according to claim 3, wherein the elastic member is a flat spring with a cross section of an arc.

11. The portable terminal according to claim 10, wherein the elastic member has a curved part of which a portion is folded to be in contact with the second groove through a projection hole.

12. The portable terminal according to claim 1, wherein at least one or more of the protrusions are formed on the folder to the left and right respectively of the second hinge axis.

13. The portable terminal according to claim 1, wherein the folder includes a plurality of protrusions on the outer surface of the folder.

14. The portable terminal according to claim 13, wherein the plurality of protrusions are positioned symmetrically with respect to the second hinge axis on the outer surface of the folder.

15. The portable terminal according to claim 1, wherein the folder is rotated about the second hinge axis by 180°.

* * * * *